United States Patent [19]

Yamada et al.

[11] Patent Number: 5,126,212

[45] Date of Patent: Jun. 30, 1992

[54] MULTI-LAYERED SINTERED SLIDING MEMBER

[75] Inventors: Shinji Yamada, Fujisawa; Hideo Ozawa, Yamato; Mitsuaki Andoh, Yokohama; Yasuhiro Shirasaka, Yamato; Hideyuki Morioka, Fujisawa, all of Japan

[73] Assignee: Oiles Corporation, Tokyo, Japan

[21] Appl. No.: 726,621

[22] Filed: Jun. 27, 1991

Related U.S. Application Data

[63] Continuation of Ser. No. 651,299, Feb. 6, 1991, abandoned.

[30] Foreign Application Priority Data

Feb. 7, 1990 [JP] Japan ................. 2-27677

[51] Int. Cl.⁵ ................................. B22F 3/00
[52] U.S. Cl. ................... 428/547; 428/552; 428/553; 428/99; 428/139; 428/156; 428/172
[58] Field of Search ............. 428/547, 552, 553, 99, 428/139, 156, 172

[56] References Cited

U.S. PATENT DOCUMENTS

| | | | |
|---|---|---|---|
| 3,885,072 | 5/1975 | Zibritosky | 428/99 |
| 3,927,990 | 12/1975 | Rothkegel et al. | 428/99 |
| 4,139,670 | 2/1979 | Fehlmann | 428/179 |
| 4,505,987 | 3/1985 | Yamada et al. | 428/553 |
| 4,767,677 | 8/1988 | Kuwayama | 428/551 |

FOREIGN PATENT DOCUMENTS

| | | |
|---|---|---|
| 50-150656 | 12/1975 | Japan. |
| 53-44408 | 4/1978 | Japan. |
| 62-116705 | 5/1987 | Japan. |
| 1108304 | 4/1989 | Japan. |
| 1200610 | 7/1970 | United Kingdom. |
| 1378030 | 12/1974 | United Kingdom. |

Primary Examiner—Stephen J. Lechert, Jr.
Attorney, Agent, or Firm—Oblon, Spivak, McClelland, Maier & Neustadt

[57] ABSTRACT

Disclosed herein is a (1) A multi-layered sintered sliding member comprising a back metal composed of a steel plate having (i) a plurality of independent protrusions formed at a surface thereof or (ii) a continuous protrusion and a plurality of independent recesses defined with said protrusions at the surface thereof and a sintered alloy layer formed integrally by securing on the surface of said back metal covering the surface of said protrusions, in which said sintered alloy layer is composed of a low density alloy region and a high density alloy region.

8 Claims, 6 Drawing Sheets

MULTI-LAYERED SINTERED SLIDING MEMBER

This application is a continuation of application Ser. No. 07/651,299, filed on Feb. 6, 1991, now abandoned.

BACKGROUND OF THE INVENTION

The present invention relates to a multi-layered sintered sliding member comprising a back metal composed of a steel plate and a sintered alloy layer formed integrally by securing on the surface of the back metal.

Heretofore, as the multi-layered sintered sliding member, for example, Japanese Patent Application Laid-Open (KOKAI) 50-150656 discloses a multi-layered sintered sliding member formed by bonding a sintered copper alloy layer to a back metal composed of a steel plate, in which the sintered alloy and the back metal are firmly secured without oxidizing a surface of the back metal by mixing an element or compound having a great standard energy for the oxidizing reaction as compared with iron in the ingredients of the sintered alloy, for example, zinc, cadmium, silicon, magnesium, aluminum or calcium silicide; and Japanese Patent Publication 56-12288 discloses a multi-layered sintered sliding member formed integrally by bonding a thin steel plate secured integrally with a sintered copper alloy layer containing at least 3% by weight of graphite dispersed therein as a lubricating material, on a thick steel plate by means of a thin phosphorbronze alloy plate.

However, since the multi-layered sintered sliding member of Japanese Patent Application Laid-Open (KOKAI) 50-150656 contains metal elements such as zinc, cadmium and silicon in the sintered alloy, the application range of the sliding member is inevitably limited and, particularly, in such an application use as a great load and impact load are intermittently exerted, for example, sliding portions of a press machine or press die, or floor plates for slidingly supporting tongue rails of a railway track point portions, plastic deformation is brought about by such load to the sintered alloy layer, and as a result, there arises a problem that the member can not be applied to the application use described above.

On the other hand, although the multi-layered sintered sliding member of Japanese Patent Publication 56-12288 is remarkably improved with the load resistance and impact resistance as compared with the sliding member of Japanese Patent Application Laid-Open (KOKAI) 50-150656, there are a problem that plastic deformation occurs in the sintered layer in the above-mentioned application use and an economical problem that the production process is complicate, thereby increasing the cost.

It has been demanded to supply a multi-layered sintered sliding member which can be used in severe conditions where great load and impact load are intermittently exerted, and which can be produced at a low cost by simplifying the production process.

As a result of the present inventors' earnest studies for overcoming the foregoing drawbacks, it has been found that by securing a sintered alloy layer on the surface of a back metal composed of a steel plate having protrusions on the surface, in which the sintered alloy layer is composed of a low density alloy region and a high density alloy region, the obtained multi-layered sintered sliding member can slidingly support the high load and impact load without causing plastic deformation against such loads. The present invention has been attained based on this finding.

SUMMARY OF THE INVENTION

In a first aspect of the present invention, there is provided a multi-layered sintered sliding member comprising a back metal composed of a steel plate having a plurality of independent protrusions at a surface thereof and a sintered alloy layer formed integrally by securing on the surface of the back metal covering the surface of the protrusions, wherein said sintered alloy layer is composed of a low density alloy region and a high density alloy region.

In a second aspect of the present invention, there is provided a multi-layered sintered sliding member comprising a back metal composed of a steel plate having continuous protrusions and a plurality of independent recesses defined with the protrusions at the surface thereof, and a sintered alloy layer formed integrally by securing on the surface of the back metal covering the surface of the protrusions, wherein said sintered alloy layer is composed of a low density alloy region and a high density alloy region.

BRIEF DESCRIPTION OF THE ACCOMPANYING DRAWINGS

DETAILED DESCRIPTION OF THE INVENTION

Figure 1:
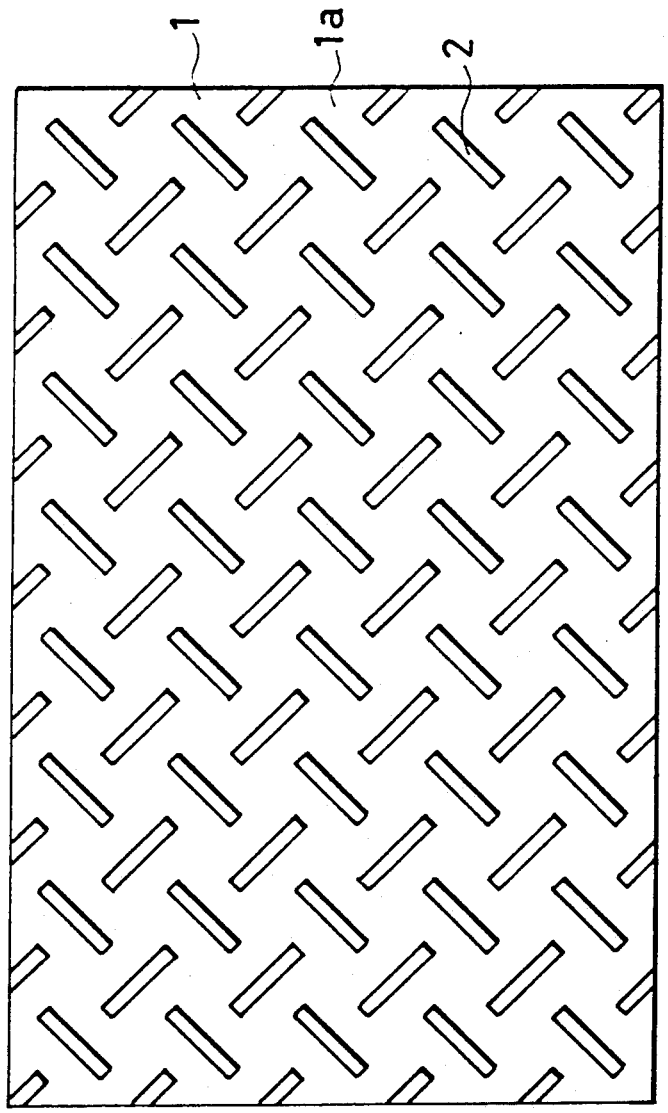
FIG. 1 is a plan view illustrating a back metal.
Figure 2:
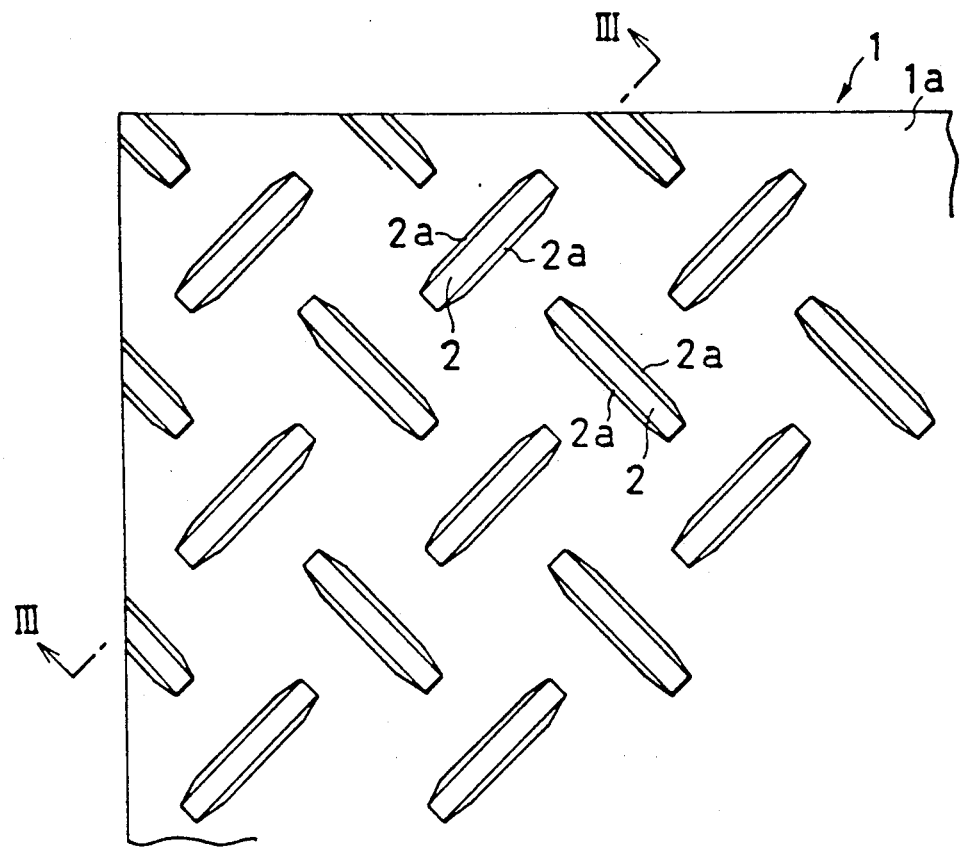
FIG. 2 is an enlarged plan view for a portion of FIG. 1.
Figure 3:
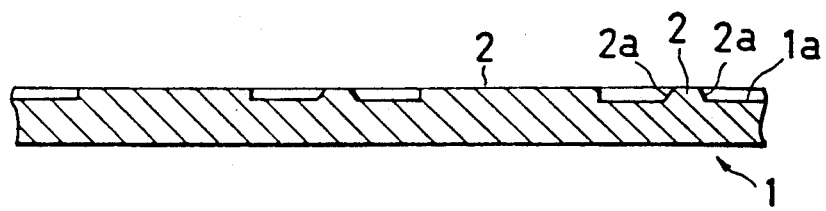
FIG. 3 is a cross sectional view taken along line III—III in FIG. 2.
Figure 4:
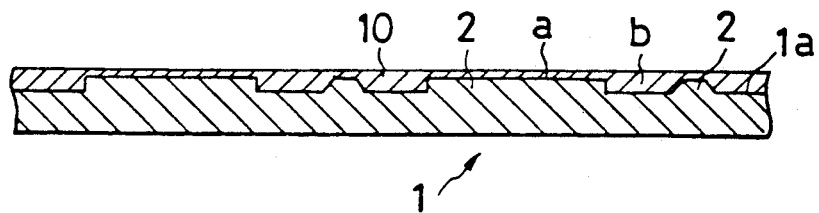
FIG. 4 is a cross sectional view illustrating a multi-layered sintered sliding member.
Figure 5:
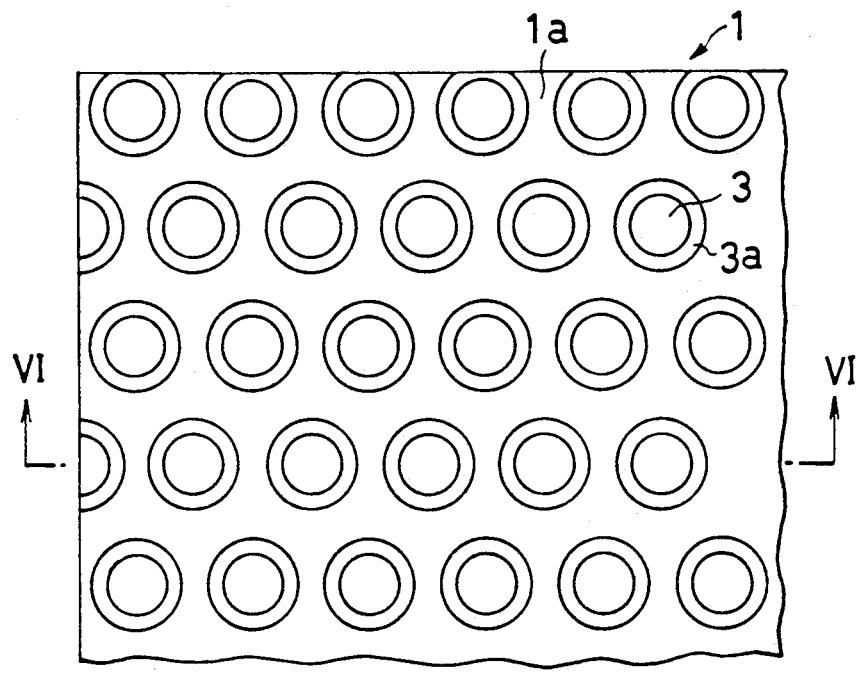
FIG. 5 is a plan view illustrating another embodiment of the back metal.
Figure 6:
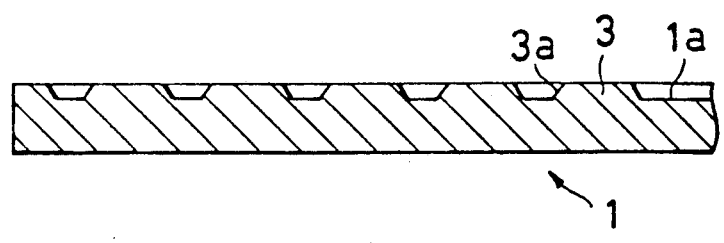
FIG. 6 is a cross sectional view taken along line VI—VI in FIG. 5.
Figure 7:
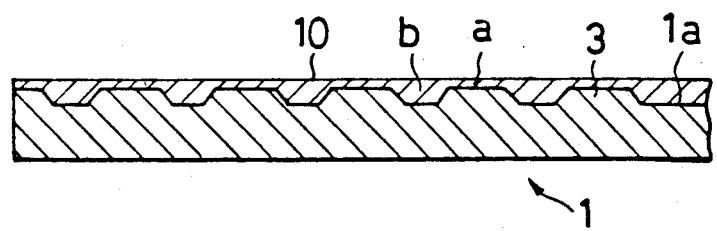
FIG. 7 is a cross sectional view illustrating a multi-layered sintered sliding member.

As a plurality of independent protrusions, there are suitably exemplified rectangular protrusions 2 in the planar shape formed at the surface 1a of a back metal 1 composed of a rectangular steel plate, in which adjacent protrusions 2 are arranged in the direction perpendicular to each other as shown in FIG. 1 to FIG. 3; and circular protrusions 3 in the planar shape formed at the surface 1a of a back metal 1 composed of a rectangular steel plate as shown in FIG. 5 to FIG. 6. The protrusion 2 or 3 has a flat surface and the peripheral portion thereof is formed as an inclined surface 2a or 3a with a downward slope from the flat surface to the surface 1a of the back metal respectively.

Figure 8:
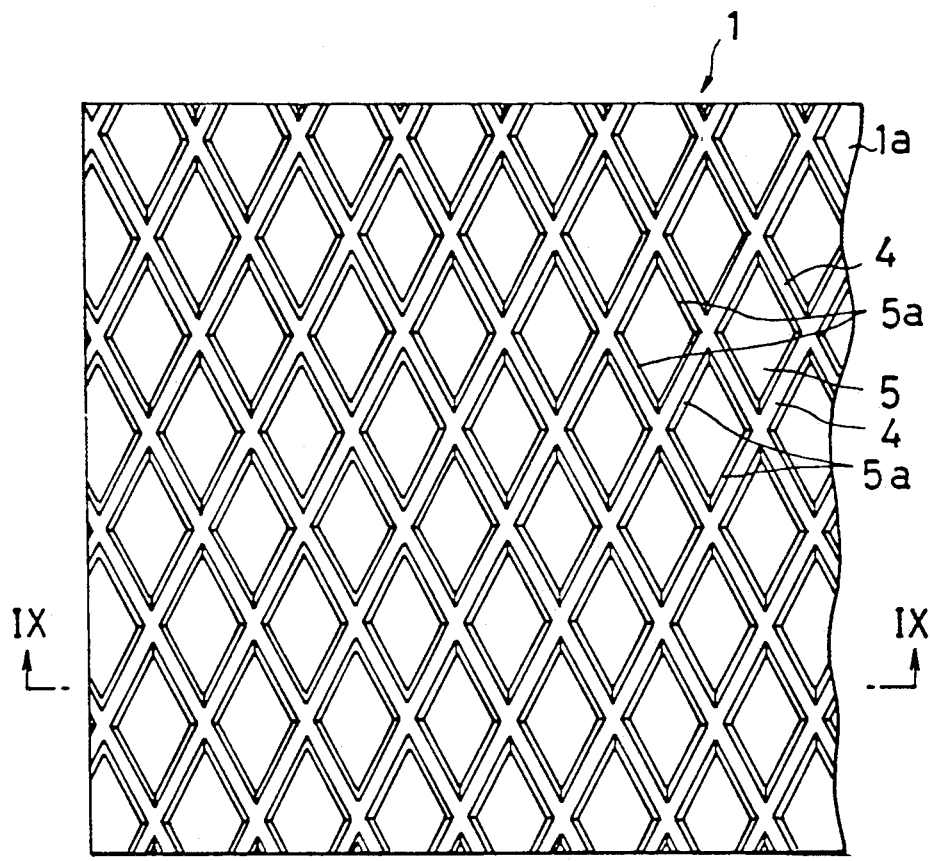
FIG. 8 is a plan view illustrating another embodiment of the back metal.
Figure 9:
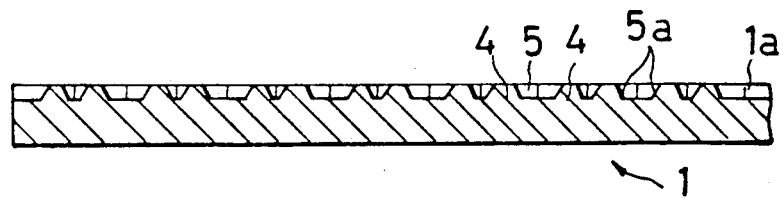
FIG. 9 is a cross sectional view taken along line IX—IX in FIG. 8.
Figure 10:
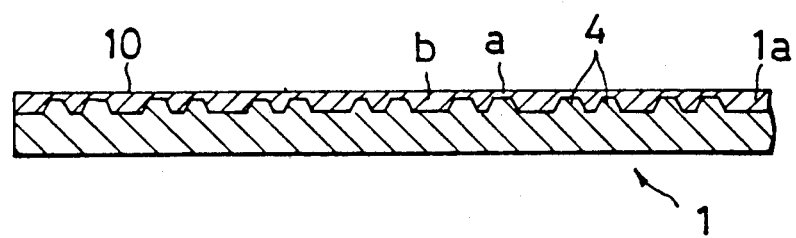
FIG. 10 is a cross sectional view illustrating a multi-layered sintered sliding member.
Figure 11:
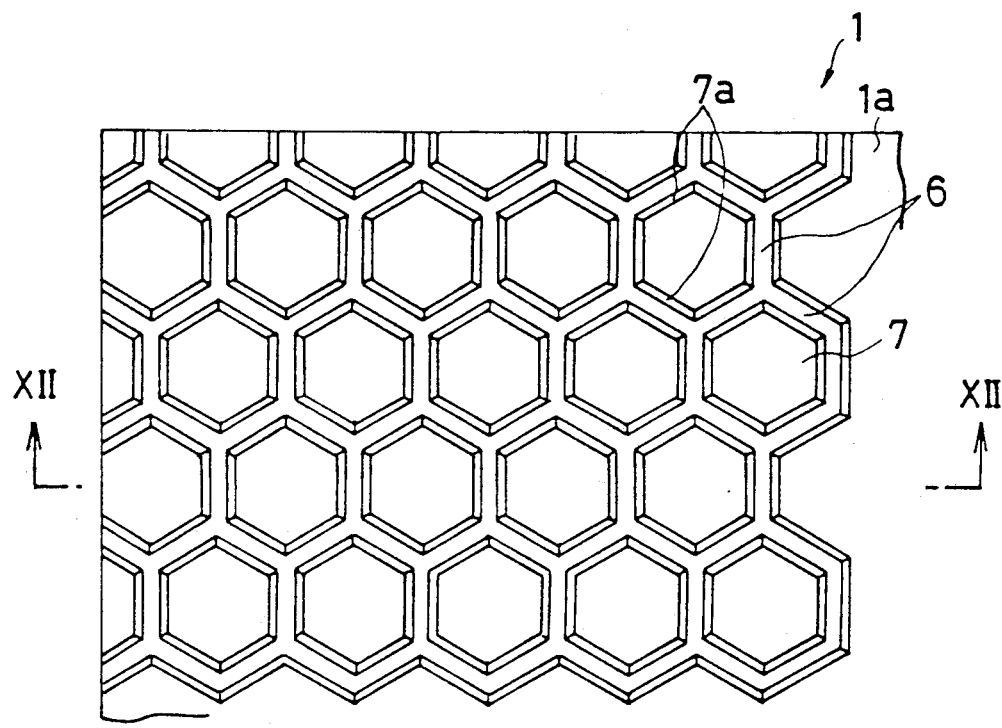
FIG. 11 is a plan view illustrating a further embodiment of the back metal.
Figure 12:
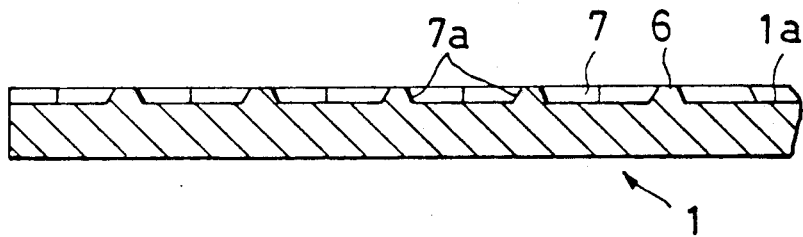
FIG. 12 is a cross sectional view taken along line XII—XII in FIG. 11.
Figure 13:
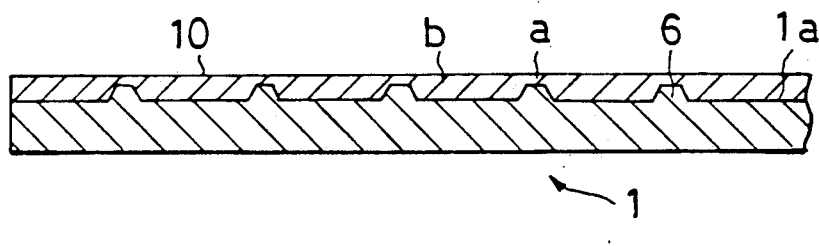
FIG. 13 is a cross sectional view illustrating a multi-layered sintered sliding member.
Figure 14:
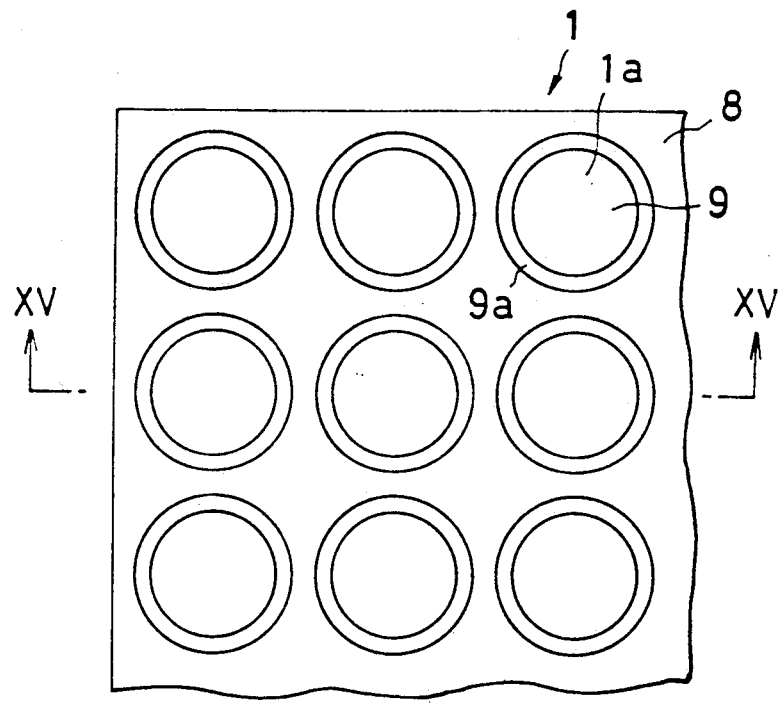
FIG. 14 is a plan view illustrating a still further embodiment of the back metal.
Figure 15:
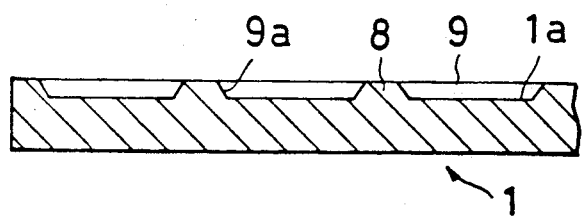
FIG. 15 is a cross sectional view taken along line XV—XV in FIG. 14.
Figure 16:
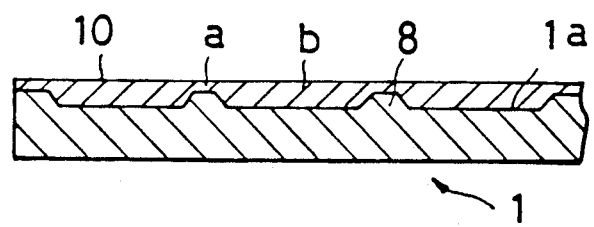
FIG. 16 is a cross sectional view illustrating a multi-layered sintered sliding member.

Further, as the continuous protrusions, there can be suitably exemplified stripe-like protrusions 4 formed in parallel with each other and with intersections at the surface 1a of a back metal 1 composed of a rectangular steel plate, in which a plurality of independent rhombic recesses 5 in the planar shape are defined with the protrusions 4 at the surface 1a of the back metal as shown in FIG. 8 to FIG. 9; protrusions 6 formed with intersections at the surface 1a of a back metal 1 composed of a rectangular steel plate, in which a plurality of independent hexagonal recesses 7 are defined with the protrusions 6 at the surface 1a of the back metal as shown in FIG. 11 to FIG. 12; and a plurality of independent circular recesses 9 in the planar shape formed by leaving continuous stripe-like protrusions 8 at the surface 1a of the back metal composed of a rectangular steel plate as shown in FIG. 14 to FIG. 15. Each of the protrusions 4, 6 and 8 has a flat surface and the peripheral portion of each of the recesses 5, 7 and 9 defined with such protrusions is formed as an inclined surface 5a, 7a and 9a with a downward slope from the flat surface to the surface 1a of the back metal.

A sintered copper alloy 10 formed integrally by securing to the surface of the protrusions formed independently or continuously at the surface 1a of the back metal 1 comprises 4 to 10 wt. % of tin, 10 to 40 wt. % of nickel, 0.1 to 4 wt. % of phosphorus, not greater than 50 wt. % of iron, not greater than 25 wt. % of manganese, 3 to 10 wt. % of graphite and the balance of copper.

Tin constituting the sintered alloy layer forms bronze by being alloyed with copper as the main ingredient, thereby contributing to the improvement of the strength, the toughness, the mechanical strength and the abrasion resistance for the matrix of the sintered alloy layer, as well as it has an effect of increasing the porosity of the sintered alloy layer in cooperation with nickel described later. Then, if the mixing ratio of tin is less than 4% by weight, the foregoing effect can not be attained sufficiently. If tin is mixed in excess of 10% by weight, it gives undesired effect on the sinterability. Accordingly, the mixing ratio of tin is suitably 4 to 10% by weight, preferably 5 to 8% by weight.

Nickel diffuses into copper as the main ingredient, thereby contributing to the improvement of the abrasion resistance and the strength of the matrix. Nickel diffuses at the surface of the back metal and the surface of the protrusions formed at the surface of the back metal to alloy the boundary thereof upon sintering, thereby increasing the bonding strength between the sintered alloy layer and the surface of the back metal or the surface of the protrusions formed at the surface of the back metal, as well as it is partially alloyed with phosphorus described later, by which nickel-phosphorus alloy is present at the boundary between the sintered alloy layer and the surface of the back metal or the surface of the protrusions formed at the surface of the back metal, thereby obtaining an effect of firmly bonding the sintered alloy layer integrally with the surface of the back metal or the surface of the protrusion at the boundary in cooperation with alloying due to the diffusion of nickel. Further, nickel has an effect of forming gaps in the sintered alloy layer when it diffuses into copper upon sintering, thereby improving the porosity. Then, the foregoing effect can not be obtained sufficiently if the mixing ratio of nickel is less than 10% by weight and no remarkable difference is obtainable with respect to the effect described above even if it is blended in excess of 40% by weight. Accordingly, the mixing ratio of nickel is suitably 10 to 40% by weight, preferably 20 to 30% by weight.

Phosphorus is partially alloyed with copper as the main ingredient and nickel as described above, thereby improving the strength of the matrix and contributing to the improvement of the abrasion resistance. Since phosphorus has a strong reducing power, it has effects of cleaning the surface of the back metal and the surface of protrusions formed at the surface of the back metal by its reducing effect, and promoting the alloying of nickel due to diffusion to the surface of the back metal and the surface of the protrusion formed at the surface of the back metal. The effect of the nickel-phosphorus alloy is as has been described above. The mixing ratio of phosphorus is suitably 0.1 to 4% by weight, preferably 1 to 2% by weight.

Graphite has to be mixed at a ratio at least not less than 3% by weight in order to provide self-lubricancy but, if the mixing ratio of graphite is increased and, for example, if it is blended in excess of 10% by weight, this brings about a problem in view of the sinterability and the bonding strength with the back metal and the surface of the protrusions formed at the surface of the back metal. Accordingly, the mixing ratio of graphite is suitably 3 to 10% by weight, preferably 5 to 8% by weight.

The iron has a less solid solubilization limit to copper, but it has an effect of dispersing into the alloy and, particularly, has an effect of improving the strength of the matrix and increasing the porosity of the sintered alloy layer when copper is diffused into iron upon sintering. Further, iron generally tends to be alloyed with phosphorus to form hard iron phosphorus alloy under the presence of phosphorus, but nickel in the ingredients has an effect of suppressing the alloying in the present invention, and accordingly a relatively great amount of iron up to about 50% by weight, preferably 30 to 40% by weight can be blended.

Manganese is diffused into copper or copper and iron as the main ingredient(s) to improve the abrasion resistance, and contributes to the improvement of the strength of the matrix. Further, manganese expands the sintered alloy layer, thereby making the sintered alloy layer porous in the course of rapidly diffusion into and alloying with copper and nickel during sintering. However, since manganese has a nature of reacting with a phosphorus-nickel alloy ($Ni_3P$) in a liquid phase, thereby increasing the melting point of the liquid phase, and according the mixture in a large amount thereof inhibits the formation of the sintered alloy layer of increased density. Accordingly, the mixing ratio of the mangenese is appropriately not greater than 25% by weight, preferably 5 to 10% by weight.

Explanation will be made to the method of manufacturing a multi-layered sintered sliding member. (First Step) As a back metal, there is prepared a rectangular steel plate having a plurality of independent protrusions at the surface, in which an inclined surface is formed at the peripheral portion of the protrusion as described above, or a rectangular steel plate having continuous protrusions at the surface, in which a plurality of independent recesses is formed with the protrusions and an inclined surface is formed at the peripheral portion of the recesses. After defatting and cleaning the back metal, the back metal and the surface of the protrusions formed at the surface of the back metal are roughened, for example, by sand blast. (Second Step) A homogenously mixed powder comprising 4 to 10 wt. % of tin, 10 to 40 wt. % of nickel, 0.1 to 4 wt. % of phosphorus, not greater than 50 wt. % of iron, not greater than 25 wt. % of manganese, 3 to 10 wt. % of graphite and the balance of copper is prepared. (Third Step) The mixed powder is uniformly scattered over the surface of the back metal and the surface of the protrusions on the surface of the back metal. (Fourth Step) The back metal having the mixed powder uniformly scattered on the surface is placed in a heating furnace conditioned to a reducing atmosphere and sintered at a temperature of 870° to 920° C. for 10 to 20 min (primary sintering) to conduct sintering of the mixed powder and diffuse—bond to the back metal, by which the pre-sintered alloy layer is integrally bonded to the surface of the back metal. (Fifth Step) Subsequently, the back metal having integrally bonded with the pre-sintered alloy layer is rolled by being passed for 3 to 4 times between a pair of rollers, thereby increasing the density of the pre-sintered alloy layer. (Six Step) The back metal having the pre-sintered alloy layer formed integrally on the surface thereof is placed in the heating furnace as described above and sintered at a temperature of 920° to 1000° C. for 10 to 20 min (secondary sintering), to proceed the sintering of the pre-sintered alloy layer and increase the bonding strength with the back metal. Subsequently, it is rolled by being passed for once through the rollers, thereby obtaining the multi-layered sintered sliding member having the flattened surface, in which the density of the sintered alloy layer thereof is further increased (FIG. 4, FIG. 7, FIG. 10 and FIG. 13).

In the sintered alloy layer of the multi-layered sintered sliding member obtained by method of such steps, a high density alloy region at the surface of the protrusion (reference numeral a in the drawing) and a low density alloy region at the surface of the back metal (reference numeral b in the drawing) are formed. (Seventh Step) The resultant multi-layered sintered sliding member is carried out a oil-impregnation treatment to obtain an oil-impregnated multi-layered sintered sliding member with a high oil-impregnation rate in the low density alloy region and a low oil-impregnation rate in the high density alloy region of the sintered alloy layer.

As another method for the production method as described above, a powder rolling method may be utilized and explanation will then be made to a method of manufacturing the multi-layered sintered sliding member by utilizing the powder rolling method. (A Step) The step is the same as the first step in the production method as described above. (B Step) To a mixed powder comprising 4 to 10 wt. % of tin, 10 to 40 wt. % of nickel, 0.1 to 4 wt. % of phosphorus, not greater than 50 wt. % of iron, not greater than 25 wt. % of manganese, 3 to 10 wt. % of graphite and the balance of copper, an aqueous solution containing 1 to 15% by weight of a powdery binder selected from hydroxypropyl cellulose (HPC), polyvinyl alcohol (PVA), carboxymethyl cellulose (CMC), hydroxyethyl cellulose (HEC), methyl cellulose (MC), gelatine, gum arabic, starch and a mixture thereof is added in an amount from 0.1 to 5% by weight and uniformly mixed, thereby obtaining a starting powder. (C Step) The starting powder is supplied to a press-roll and molded into a rolled sheet, which is then cut into an appropriate shape. (D Step) The rolled sheet is superposed on the back metal prepared in the A step and is sintered in a heating furnace conditioned to a reducing atmosphere or vacuum at a temperature of 870° to 1000° C. under a pressure of 0.1 to 5.0 kgf/cm² for 20 to 60 min to conduct the sintering of the rolled sheet and the diffusion bonding to the back metal, thereby obtaining a multi-layered sintered sliding member in which the sintered alloy layer is integrally bonded to the surface of the back metal.

A high density alloy region at the surface of the protrusion and a low density alloy region at the rear face of the back metal are formed in the sintered layer of the multi-layered sintered sliding member obtained through the foregoing steps. (E Step) This step is the same as the seventh step in the previous manufacturing method.

In this manufacturing method, the density and the thickness of the rolled sheet from the starting powder can be controlled by a rolling load and the rolling load depends on a roll speed and a roll gap.

Accordingly, the density and the thickness of the rolled sheet can properly be adjusted by varying the roll speed and the roll gap.

In any of the manufacturing methods described above, since the peripheral portion of a plurality of independent protrusions or continuous protrusions formed at the surface of the back metal are formed as inclined surfaces, a high bonding strength can be obtained between the protrusions and the sintered alloy layer formed integrally by securing on the surface of the protrusions. Then, in the sintered layer of the thus manufactured multi-layered sintered sliding member, a sintered alloy region having a low density (5-6 g/cm³), preferably a low density (5-6 g/cm³) and high oil-impregnation rate (25 to 30 vol %), and a sintered alloy region having a high density (7-8 g/cm³) preferably a high density (7-8 g/cm³) and low oil-impregnation rate (11-14 vol %) are formed.

The deformation amount ($\mu$m) for the thickness at an impact load of 3,000 kgf/cm² is not greater than 47 $\mu$m at 100,000 duration cycles, preferably not greater than ‐45 $\mu$m at 100,000 duration cycles. The friction coefficient of the multi layered sintered sliding member according to the present invention is 0.15 to 0.3, preferably 0.15 to 0.23; the friction coefficient to the sliding surface under the state of scattering water and dust is not more than 0.42, preferably 0.18 to 0.40, and the abrasion amount is not more than 20 $\mu$m, preferably 16.0 to 18.5 $\mu$m.

In the multi-layered sintered sliding member according to the present invention, since the low density alloy region and the high density alloy region are present together in the sintered alloy layer, the pressure-resistant strength of the sintered alloy layer can be increased to slidingly support the high load and impact load without causing plastic deformation or the like of the sintered alloy layer against such loads.

Further, with the high oil impregnation alloy region and the low oil impregnation alloy region in the sintered alloy layer, the velocity characteristic (friction coefficient) and the abrasion resistance as the sliding member can be improved remarkably.

Accordingly the multi-layered sintered sliding member according to the present invention can be applied to such application use that high load and impact load are intermittently exerted, such as floor plates for slidingly supporting tongue rails in a railway track point.

The present invention is explained in more detail in the following Examples; however, it should be recognized that the scope of the present invention is not restricted to these Examples.

EXAMPLE 1

(First Step) A rectangular steel plate (rolled steel plate SS41) used as a back metal 1 had a plurality of independent rectangular protrusions 2 in the planar shape arranged in the direction perpendicular to each other on a surface 1a, in which the surface of the protrusion 2 was formed as a flat surface and the peripheral portion of the protrusion 2 was formed as an inclined surface 2a with a downward slope from the surface of the protrusion to the surface 1a of the back metal (150 mm of length, 260 mm of width, 8 mm in thickness up to the surface of the back metal and 1.695 mm of height for the protrusion) [FIG. 1 to FIG. 3]. The ratio of the area for the flat surface of the protrusions 2 formed at the surface 1a of the back metal to the entire surface area was 14%. After defatting and cleaning the surface 1a of the back metal 1 and the surface of the protrusion 2, they were roughened by sand blasting.

(Second Step) 8% by weight of an atomized tin powder passing through 250 mesh, 28% by weight of an electrolytic nickel powder passing through 250 mesh, 7% by weight of a phosphor-copper (phosphorus content: 15%) alloy powder passing through 120 mesh, 5% by weight of a graphite powder passing through 150 mesh and the balance of an electrolytic copper powder passing through 150 mesh were mixed by a mixer for 10 min to obtain a mixed powder (Cu: 58 wt. %, tin: 8 wt. %, nickel: 28 wt. %, phosphorus: 1 wt. % and graphite: 5 wt. %)

(Third Step) The mixed powder was uniformly scattered over the surface 1a of the back metal and the surface of the protrusions 2 at the surface of the back metal, thereby forming a mixed powder layer having a thickness of 3.5 mm on the surface of the protrusion and a thickness of 5.2 mm on the surface 1a of the back metal.

(Fourth Step) The back metal 1 having a mixed powder layer uniformly scattered on the surface thereof was placed in a heating furnace conditioned to a reducing atmosphere and sintered at a temperature of 920° C. for 10 min (primary sintering) to conduct sintering of the mixed powder and diffusion bonding to the back metal, thereby integrally bonding the sintered alloy layer onto the back metal.

(Fifth Step) Subsequently, the back metal having the pre-sintered alloy layer integrally bonded therewith was rolled by being passed for three times between a pair of rollers, thereby increasing the density of the pre-sintered alloy layer. After rolling, the thickness of the pre-sintered alloy layer was 1.5 mm in the sintered alloy layer on the protrusions 2 at the surface of the back metal and 3 mm in the sintered alloy layer on the surface 1a of the back metal.

(Sixth Step) The back metal having the pre-sintered alloy layer integrally bonded therewith was placed in the heating furnace described above and sintered at a temperature of 950° C. for 10 min (secondary sintering) to proceed the sintering of the pre-sintered alloy layer and increase the bonding strength with the back metal. Subsequently, the back metal was rolled by being passed for once between a pair of rollers described above to obtain a multi-layered sintered sliding member, wherein the density of the sintered alloy layer was increased and the surface thereof was flattened with a good accuracy.

The sintered alloy layer of the thus obtained multi-layered sintered sliding member was formed with a thickness of 1.2 mm on the surface of the protrusions 2 and with a thickness of 2.3 mm on the surface 1a of the back metal, and the density of the sintered alloy layer on the surface of the protrusion 2 was 7.4 g/cm³ and the density of the sintered alloy layer on the surface of the back metal was 5.3 g/cm³.

(Seventh Step) Oil-impregnation treatment was applied to the multi-layered sintered sliding member to obtain an oil-impregnated multi-layered sintered sliding member with an oil impregnation rate of 13 vol % in the high-density sintered alloy region on the surface of the protrusions and 29 vol % in the low-density sintered alloy region on the surface of the back metal.

EXAMPLE 2

(First Step) A rectangular steel sheet (rolled steel plate SS41) used as a back metal 1 had continuous stripe-like protrusions 4 formed in parallel with each other and with intersections at the surface 1a and a plurality of rhombic recesses 5 in the planar shape defined with the protrusions 4 at the surface 1a, in which the surface of the protrusion 4 was formed into a flat surface and the peripheral portion thereof was formed into an inclined surface 5a with a downward slope from the surface of the protrusion to the surface of the back metal (150 mm of length, 260 mm of width, 8 mm in thickness up to the surface of the back metal and 1.695 mm of height for the protrusion) [refer to FIG. 8 and FIG. 9]. The area ratio of the flat surface of the stripe-like protrusions 4 formed continuously at the surface 1a of the back metal to the entire surface area was 28%. After defatting and cleaning the surface 1a of the back metal 1 and the surface of the protrusions 4, they were roughened by sand blasting.

(Second Step) 5% by weight of an atomized tin powder passing through 250 mesh, 20% by weight of an electrolytic nickel powder passing through 250 mesh, 1.5% by weight of a phosphor powder passing through 120 mesh, 32% by weight of a reduced iron powder passing through 300 mesh, 5% by weight of a graphite powder passing through 150 mesh and the balance of a electrolytic copper powder passing through 150 mesh were mixed by a mixer for 10 min to obtain a powder mixture (Cu: 36.5 wt. %, tin: 5 wt. %, nickel: 20 wt. %, phosphorus: 1.5 wt. %, iron: 32 wt. % and graphite: 5 wt. %).

(Third Step) The mixed powder was uniformly scattered over the surface 1a of the back metal and the surface of the protrusions 4 at the surface of the back metal, thereby forming a mixed powder layer having a thickness of 3.5 mm on the surface of the protrusions 4 and a thickness of 5.2 mm on the surface 1a of the back metal.

(Fourth Step) The back metal 1 having a mixed powder layer uniformly scattered on the surface was placed in a heating furnace conditioned to a reducing atmosphere and sintered at a temperature of 920° C. for 10 min (primary sintering) to conduct sintering of the mixed powder and diffusion bonding to the back metal, thereby integrally bonding the pre-sintered alloy layer onto the back metal.

(Fifth Step) Subsequently, the back metal having the pre-sintered alloy layer integrally bonded therewith was rolled by being passed for three times between a pair of rollers, thereby increasing the density of the pre-sintered alloy layer. After rolling, the thickness of the pre-sintered alloy layer was 1.5 mm in the sintered alloy layer on the protrusions 4 at the surface of the back metal and 3 mm in the sintered alloy layer on the surface 1a of the back metal.

(Sixth Step) The back metal having the pre-sintered alloy layer integrally bonded therewith was placed in the heating furnace described above and sintered at a temperature of 950° C. for 10 min (secondary sintering) to proceed the sintering of the pre-sintered alloy layer and increase the bonding strength with the back metal. Subsequently, the back metal was rolled by being passed for once between a pair of rollers described above to obtain a multi-layered sintered sliding member wherein the density of the sintered alloy layer was increased and the surface thereof was flattened with a good accuracy.

The sintered alloy layer of the thus obtained multi-layered sintered sliding member was formed with a thickness of 1.2 mm on the surface of the protrusions 4 and with a thickness of 2.3 mm on the surface 1a of the back metal, and the density of the sintered alloy layer on the surface of the protrusion 4 was 7.4 g/cm$^3$ and the density of the sintered alloy layer on the surface of the back metal was 5.8 g/cm$^3$.

(Seventh Step) Oil-impregnation treatment was applied to the multi-layered sintered sliding member to obtain an oil-impregnated multi-layered sintered sliding member with an oil impregnation rate of 11 vol % in the high density alloy region on the surface of the protrusion and 29 vol % in the low density alloy region on the surface of the back metal.

Subsequently, the multi-layered sintered sliding members obtained in the examples described above were applied to floor plates for slidingly supporting tongue rails of railway track points, and the results of a test for the impact shock resistance and friction characteristics under various circumstantial conditions of the sliding members will now be explained.

(Test Method for the Impact Shock Resistance)

A sleepers was fixed on a press bolster of a pressing machine and a load cell was disposed securely by means of a countersunk spring on the sleeper. A test specimen (multi-layered sintered sliding member) was fixed on the load cell and a mating member is fixed on a press-slide of the pressing machine. Then, the slide was actuated vertically in order to apply an impact load to the test specimen and the deformation amount (μm) for the thickness of the test specimen was measured.

| (Test Conditions) | |
|---|---|
| Moving speed of press slide: (vertical movement of the slide as one cycle) | 80 CPM |
| Load: | 3,000 kgf/cm$^2$ |
| Acceleration: | about 20 G |
| Duration cycle: | 100,000 cycles |
| Mating member: | black annealed S50C |

The results of the test conducted by the test method and under the test conditions as described above are as shown in Table 1.

TABLE 1

| Impact Load Number of cycles | | 3,000 kgf/cm$^2$ | | |
|---|---|---|---|---|
| | | 1,000 cycles | 10,000 cycles | 100,000 cycles |
| Example 1 | Test specimen | 27 μm | 35 μm | 44 μm |

TABLE 1-continued

| Impact Load Number of cycles | | 3,000 kgf/cm$^2$ | | |
|---|---|---|---|---|
| | | 1,000 cycles | 10,000 cycles | 100,000 cycles |
| | Mating member | 25 μm | 28 μm | 33 μm |
| Example 2 | Test specimen | 25 μm | 30 μm | 40 μm |
| | Mating member | 22 μm | 25 μm | 30 μm |
| Prior Art | Test specimen | 280 μm | 650 μm | — |
| | Mating member | 5 μm | 29 μm | — |
| Existent Product | Test specimen | 30 μm | 32 μm | 52 μm |
| | Mating member | 22 μm | 23 μm | 33 μm |

In the table, prior art is a multi-layered sintered sliding member disclosed in Japanese Patent Publication 56-1288 described above and existent product is a sliding member in which lubricant is oiled to a rolled steel sheet (SS41).

From the result of the test, the multi-layered sintered sliding members of Example 1 and Example 2 can remarkably improve the impact resistance performance as compared with the multi-layered sintered sliding member of the prior art and they can provide performance as comparable with or superior to that of the oil feed type sliding member of the existent product.

The frictional characteristics were tested by the following test method and test conditions.

(Test Method)

A test specimen was fixed on a base, and a tongue rail is disposed on the test specimen, and a tongue rail is secured to a piston rod of an air cylinder fixed on the side of the base. A load is placed on the tongue rail, the cylinder was reciprocated while slidingly supporting the tongue rail on the test specimen and the friction coefficient between both of them was measured.

| (Test Condition) | |
|---|---|
| Load: | 250 kgf |
| Speed: | 200 mm/sec |
| Stroke: | 200 mm |

Cycle of stroke: 5,000 cycles under each of circumstantial conditions
Circumstantial conditions: (1) normal state, (2) state of splaying water to the sliding surface, (3) state of scattering dust to the sliding surface, (4) state of scattering water and dust to the sliding surface.

The results of the test carried out by the test method under the test conditions as described above are as shown in Table 2.

Water scattering, dust scattering, water and dust scattering in (2) (3) and (4) were carried out on every 1,000 cycle of stroke.

TABLE 2

| | Friction coefficient under various circumstantial conditions | | | | Abrasion amount |
|---|---|---|---|---|---|
| | (1) | (2) | (3) | (4) | (μm) |
| Example 1 | 0.20 | 0.19 −0.21 | 0.19 −0.30 | 0.20 −0.40 | 18.3 |
| Example 2 | 0.18 | 0.19 −0.20 | 0.19 −0.25 | 0.20 −0.30 | 16.2 |

In the table, the upper limit values for the friction coefficient in (1), (2) and (3) are values upon water scattering, dust scattering or water and dust scattering to the sliding surface, respectively.

From the result of the test, the multi-layered sintered sliding members a Example 1 and Example 2 showed stable friction coefficient under various circumferential conditions with no oil feeding at all after starting the test. The friction coefficient and the abrasion amount show the comparable performance with those of the existent product in which lubricant is fed to a rolled steel sheet (SS41).

In view of the present situation in which a rolled steel sheet (SS51) is used as the floor plate for slidingly supporting the tongue rail and the abrasion, scorching, etc. are prevented by feeding the lubricant to the sheet, the multi-layered sintered sliding member according to the present invention can provide an effect capable of saving manual oiling operation of lubricant.

Further, as compared with the method disclosed in Japanese Patent Publication 56-12288, the production method can be simplified and the production cost can be reduced.

What is claimed is:

1. A multi-layered sintered sliding member comprising a back metal composed of a steel plate having a plurality of independent protrusions formed at a surface thereof and a sintered alloy layer formed integrally by securing on the surface of said back metal covering the surface of said protrusions, in which said sintered alloy layer is composed of a low density alloy region and a high density alloy region.

2. A multi-layered sintered sliding member according to claim 1, wherein said surface of each of the plurality of independent protrusions is formed as a flat surface and the peripheral portion thereof is formed as an inclined surface with a downward slope from the surface of said protrusion to the surface of the back metal.

3. A multi-layered sintered sliding member according to claim 1, wherein said sintered alloy layer comprises 4 to 10 wt. % of tin, 10 to 40 wt. % of nickel, 0.1 to 4 wt. % of phosphorus, 3 to 10 wt. % of graphite and the balance of copper.

4. A multi-layered sintered sliding member according to claim 3, wherein said sintered alloy layer further contains not greater than 50 wt. % of iron and not greater than 25 wt. % of manganese.

5. A multi-layered sintered sliding member comprising a back metal composed of a steel plate having a continuous protrusion and a plurality of independent recesses defined with said protrusions at the surface thereof and a sintered alloy layer formed integrally by securing on the surface of said back metal covering the surface of said protrusions, in which said sintered alloy layer is composed of a low density alloy region and a high density alloy region.

6. A multi-layered sintered sliding member according to claim 5, wherein said surface of the continuous protrusion is formed as a flat surface and the peripheral portion of the plurality of independent recesses defined with said protrusion is formed as an inclined surface with a downward slope from the surface of said protrusion to the surface of the back metal.

7. A multi-layered sintered sliding member according to claim 5, wherein said sintered alloy layer comprises 4 to 10 wt. % of tin, 10 to 40 wt. % of nickel, 0.1 to 4 wt. % of phosphorus, 3 to 10 wt. % of graphite and the balance of copper.

8. A multi-layered sintered sliding member according to claim 7, wherein the sintered alloy layers further contains not greater than 50 wt. % of iron and not greater than 25 wt. % of manganese.

* * * * *